United States Patent
Oliver et al.

(10) Patent No.: US 10,426,133 B2
(45) Date of Patent: Oct. 1, 2019

(54) APPARATUS AND METHOD FOR FEEDING AN ANIMAL

(71) Applicant: HAYGAIN LTD, Lambourn, Berkshire (GB)

(72) Inventors: Timothy Michael Oliver, Berkshire (GB); Brian Gordon Fillery, Berkshire (GB); Gordon David Perrin, Wiltshire (GB)

(73) Assignee: HAYGAIN LTD., Lambourn, Berkshire (GB)

( * ) Notice: Subject to any disclaimer, the term of this patent is extended or adjusted under 35 U.S.C. 154(b) by 0 days.

(21) Appl. No.: 15/501,572

(22) PCT Filed: Aug. 4, 2015

(86) PCT No.: PCT/GB2015/052251
§ 371 (c)(1),
(2) Date: Feb. 3, 2017

(87) PCT Pub. No.: WO2016/020666
PCT Pub. Date: Feb. 11, 2016

(65) Prior Publication Data
US 2017/0215374 A1    Aug. 3, 2017

(30) Foreign Application Priority Data
Aug. 4, 2014 (GB) .................................. 1413803.6

(51) Int. Cl.
*A01K 5/01* (2006.01)

(52) U.S. Cl.
CPC ...................................... *A01K 5/01* (2013.01)

(58) Field of Classification Search
CPC ...... A01K 5/01; A01K 5/0114; A01K 5/0142; A01K 5/0233; A01K 5/0275; A01K 5/0283
See application file for complete search history.

(56) References Cited

U.S. PATENT DOCUMENTS

| 387,821 A | * | 8/1888 | Name Not Available ................... A01K 5/008 119/65 |
| 564,788 A | | 7/1896 | Hermany |

(Continued)

FOREIGN PATENT DOCUMENTS

| FR | 2722647 | 7/1994 |
| GB | 2510110 A | 7/2014 |

(Continued)

OTHER PUBLICATIONS

Intellectual Property Office/UK; Patent Search Report issued for Application No. GB 1413803.6 dated Apr. 30, 2015.

(Continued)

*Primary Examiner* — Monica L Williams
*Assistant Examiner* — Aaron M Rodziwicz
(74) *Attorney, Agent, or Firm* — Rothwell, Figg, Ernst & Manbeck, P.C.

(57) ABSTRACT

A slow feeder includes a container for, in use, containing food for an animal. The container has a side wall through which a slot (26) is defined; and a feeding restrictor (6). The feeding restrictor (6) comprises a food-covering element through which at least one opening is defined for, in use, resting on top of the food such that the animal can access the food through the opening; a locating element which extends from the food-covering element through the slot; and a retaining element (34) extending from the locating element and movably engageable with an outer portion of the container. The engagement of the retaining element (34) with the outer portion of the container retains the restrictor (6) in the container.

22 Claims, 5 Drawing Sheets

(56) References Cited

U.S. PATENT DOCUMENTS

| | | | | | |
|---|---|---|---|---|---|
| 2,794,473 | A | * | 6/1957 | Williams | B65D 31/06 220/611 |
| 3,040,897 | A | * | 6/1962 | Holman | B65D 1/10 210/237 |
| 3,589,340 | A | * | 6/1971 | Beliles | A01K 5/01 119/61.54 |
| 5,887,544 | A | * | 3/1999 | Popelier | A01K 5/01 119/61.54 |
| 5,971,202 | A | * | 10/1999 | Filbrun | A47G 19/2211 220/719 |
| 6,431,117 | B1 | * | 8/2002 | Rauch | A01K 5/01 119/58 |
| 7,753,000 | B1 | * | 7/2010 | Turner | A01K 5/01 119/57 |
| 8,082,882 | B1 | * | 12/2011 | Tharp | A01K 5/01 119/60 |
| 8,342,128 | B2 | * | 1/2013 | Rocker | A01K 5/0128 119/61.2 |
| 8,381,684 | B2 | * | 2/2013 | Crawford | A01K 5/0114 119/61.1 |
| 8,651,055 | B2 | * | 2/2014 | Dreger | A01K 5/0135 119/61.5 |
| 8,887,665 | B2 | * | 11/2014 | Rocker | A01K 5/0128 119/61.2 |
| D762,017 | S | * | 7/2016 | Tsengas | D30/121 |
| D821,039 | S | * | 6/2018 | Owens, III | D30/129 |
| 2012/0090549 | A1 | * | 4/2012 | Tharp | A01K 5/01 119/51.5 |
| 2015/0359190 | A1 | * | 12/2015 | Chylinski | A01K 5/01 119/60 |
| 2016/0374312 | A1 | * | 12/2016 | Tharp | A01K 5/0114 119/51.5 |

FOREIGN PATENT DOCUMENTS

| | | |
|---|---|---|
| GB | 2528916 A | 2/2016 |
| WO | 2016020666 A1 | 2/2016 |

OTHER PUBLICATIONS

Athina Nickitas-Etienne; EPO/ISA; ISR and Written Opinion issued for PCT/GB2015/052251 (Haydain Ltd.) dated Oct. 22, 2015.

International Search Report and the Written Opinion of the International Searching Authority, issued in corresponding International Application No. PCT/GB2017/052080, dated Dec. 11, 2017, 17 pages.

Intellectual Property Office Great Britain Search Report, issued in corresponding Great Britain Application No. GB1612318.4, dated Nov. 10, 2017, 1 page.

International Preliminary Report on Patentability, issued in corresponding International Application No. PCT/GB2017/052080, dated Jan. 15, 2019, 12 pages.

* cited by examiner

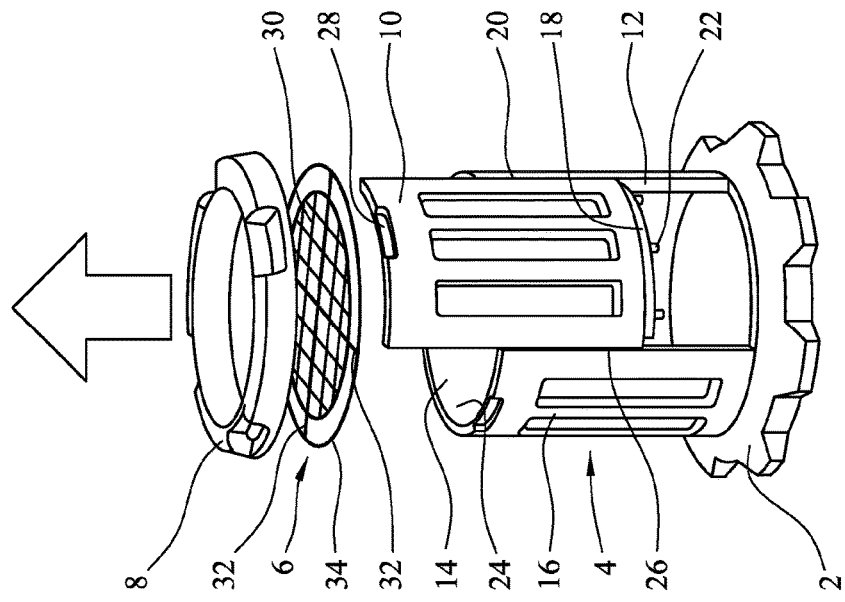
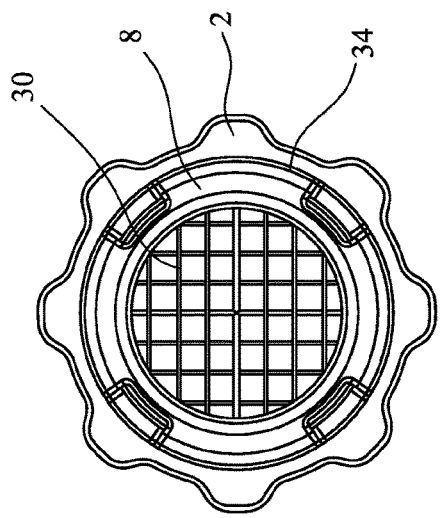
FIGURE 1
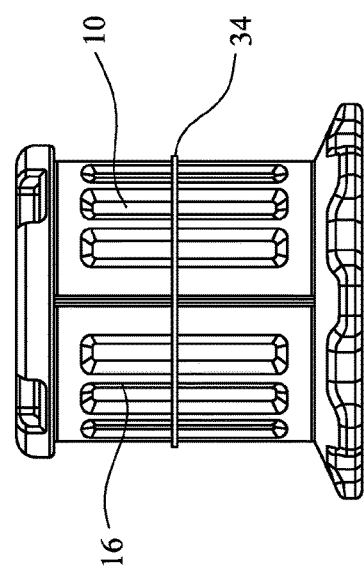
FIGURE 2
FIGURE 6

APPARATUS AND METHOD FOR FEEDING AN ANIMAL

The invention relates to an apparatus and method for feeding an animal, and in particular to a slow-feeding apparatus and method for feeding an animal, such as a horse.

Horses are commonly fed loose forage, such as hay, haylage, other derivatives of hay, straw, or mixed forage, either directly off the ground, from hay nets or from hay racks. Most stabled horses tend to eat their food rapidly, and then spend time inactive in their stable. This does not reflect the natural grazing behaviour of a horse and can cause serious digestive, metabolic and behavioural problems.

A slow feeder is an apparatus for reducing the rate at which an animal feeds, to reflect more closely the natural feeding pattern of the animal and so to avoid health problems which arise when an animal, such as a horse, feeds too rapidly. The use of a slow feeder may be termed trickle feeding.

A conventional slow feeder comprises a container for forage, such as hay, with an open upper end. A feeding restrictor rests on top of the forage in the container. Openings are defined through the restrictor, such that the animal can access the forage through the openings. Typically, the restrictor is in the form of a planar, or flat, grid, grate, mesh or net.

As an animal consumes the forage through the holes in the restrictor, the volume of forage in the container reduces and the restrictor continues to rest on top of the forage, moving downwardly within the container.

It is important that the restrictor can move freely downwards within the slow-feeder container as the forage is consumed, and does not jam, or get stuck, at an intermediate point before all of the forage is consumed. This is a problem in conventional slow feeders because, if and when the restrictor jams, the animal is prevented from eating further forage. This problem is often caused if an animal feeds from only one side of the container, so that the restrictor tilts within the container.

It is also important to secure the feeding restrictor of a slow feeder so that it is retained in the container and cannot be lifted out by the feeding animal.

In the prior art, attempts have been made to secure slow-feeder restrictors so that they are safely retained within the container but are still free to move downwards as the forage is consumed. For example, in a conventional slow feeder one or more fixed, vertical guide bars or rods may be positioned in the container and pass through openings in the restrictor, in order to retain the restrictor while allowing it to move downwards. But the problem remains that the restrictor tends to tilt and jam in place against the guide bar(s), or may be blocked by forage caught between the guide bar(s) and the restrictor, before all of the forage is eaten.

SUMMARY OF INVENTION

The invention relates to a feeding apparatus, or slow feeder, and a method for feeding animals as defined in the appended independent claims, to which reference should now be made. Preferred or advantageous features of the invention are set out in dependent subclaims.

In a first aspect, the invention may thus advantageously provide a slow feeder for containing food for feeding an animal, comprising a container and a feeding restrictor. The container, in use, contains the food, which may comprise forage and/or hard feed, such as nuts, oats, rolled oats or barley, composite feeds (including cereal-based and nutrient-dense fibre feeds) etc. It may comprise a mixture of foods. The container has an open upper end and the restrictor comprises a food-covering element which rests on top of the food. The food-covering element is shaped and sized to fit within the container and at least one opening is defined through the food-covering element, through which the animal can access the food. The food-covering element is preferably planar, or flat, and may, for example, take the form of a grid, grate, mesh, or net, extending across most or all of an upper surface of the food within the container. The animal should not be able to access the food except through the opening(s) in the food-covering element.

Advantageously, a slot is defined through a side wall of the container, and the restrictor comprises a locating element which extends, during use, outwardly from the food-covering element through the slot. The slot is preferably narrow enough to retain the food in the container, though a small quantity of food falling out of the container through the slot causes no difficulty.

The restrictor advantageously further comprises a retaining element which is connected to or coupled to or extends from the locating element and is slidably engagable with, or can abut against, an outer portion or surface of the container.

In a preferred embodiment, the outer portion of the container with which the retaining element is slidably engageable may be an outer surface of the side wall itself. This may simplify construction of the slow feeder by enabling the use of, for example, a plain side wall of a predetermined thickness.

As an animal eats food through the opening(s) in the food-covering element, the food-covering element falls downwardly within the container and the locating element slides downwardly along the slot. The engagement, or abutment, of the retaining element against the outer portion of the container advantageously retains the restrictor in the container and prevents the restrictor from tilting, or tilting excessively in such a way as might prevent the restrictor from falling downwardly as the food is progressively eaten. Thus the restrictor preferably remains in substantially the same orientation, such as horizontal or substantially horizontal, at all times, advantageously tilting by less than 5°, 10°, 15°, or 20° from a predetermined orientation.

In a preferred embodiment of the invention, the retaining element encircles or surrounds the container. The outer portion of the container, or the outer surface of the side wall, against which the restrictor engages or abuts, may be of a predetermined shape. For example the container may, in plan view, be in the shape of a circle, a square or rectangle, a regular or irregular polygon, or any other shape. Advantageously, the retaining element is then a ring of the same or similar shape, encircling or surrounding the container. The size of the retaining element is preferably slightly larger than the size of the periphery of the outer portion of the container, for example being spaced from the outer portion by more than 5 mm or 10 mm, and less than 50 mm or 30 mm or 20 mm. The spacing may even be less than 15 mm.

If the container is cylindrical, such that its cross-sectional shape and size is the same at all heights (when oriented for use), then the retaining element may be sized relative to the size of the outer portion of the container at any point. If the size of the container varies with height, for example if it is tapered, then the clearance between the retaining element and the outer portion of the container may be measured at the point of largest cross section of the container within the range of movement of the restrictor.

Forming the retaining element closely encircling or surrounding the outer portion of the container may advantageously prevent the feeding restrictor from tilting excessively during use. The restrictor may then advantageously only adopt a small tilt angle before the retaining element engages with, or abuts, the outer portion of the container and prevents further tilting.

If the shape and size of the restriction element are such that it is positioned close to the outer portion of the container at sufficient points around its length, or circumference, or at sufficient points around an outer periphery of the container, then excessive tilting of the feeding restrictor in any direction may advantageously be prevented.

A slow feeder embodying the invention preferably has more than one slot defined in its side wall. The feeding restrictor preferably then comprises a plurality of locating elements which extend through some or all of the slots. The slots are advantageously spaced around the container, preferably being evenly spaced.

The or each slot preferably extends downwardly along the side wall, when the container is oriented for use. Thus, when the restrictor is engaged with the slot or slots, it can fall downwards as the animal feeds. The slots may be vertical or they may be inclined, for example helically around the container, but if more than one slot is present, then the slots should be parallel to each other so that the restrictor can fall without tilting.

In preferred embodiments, the container may comprise two slots on opposite sides of the container, or three or four slots evenly spaced around the side wall of the container.

The or each locating element may comprise a rod extending outwardly from the food-covering element of the feeding restrictor, to extend through the or each slot. The retaining element may comprise a ring, or a continuous band, coupled to the ends of a plurality of locating elements, or it may comprise a separate retaining-element portion attached to the end of each of one or more locating elements, such as a cross-bar attached to each locating element.

When an animal feeds from a slow feeder, there may be a risk that the animal could lift the feeding restrictor out of the container, unless the feeding restrictor is restrained. In order to prevent this in embodiments of the invention, an upper end of one or more slots in the side wall of the container may be closed. This may be achieved using blind-ended slots or by means of a separate slot-closure element.

In a further aspect, the invention may advantageously provide a method for feeding food to an animal, comprising the steps of providing a container having a side wall through which a slot is defined, and providing a feeding restrictor having a locating element engageable with the slot. The locating element protrudes outwardly through the slot and is coupled or connected to a restraining element, which is slidably engageable with an outer portion of the container, to limit tilting of the restrictor. Food is placed in the container so that the restrictor rests on top of the food, and an animal is allowed to feed, drawing food through the restrictor. The locating element thus moves down the slot, together with the restrictor, as the food is eaten.

In the prior art, as described above, guide bars or rods are fixed inside a slow-feeder container, passing through holes in the feeding restrictor to retain and guide the feeding restrictor. This not only causes the risk that the restrictor would tilt and jam, but also occupies space within the container and makes it hard to clean. By contrast, in preferred embodiments of the present invention the container may contain no fixed structures at all, maximising the volume of food it can contain and making it easy to clean and refill.

DESCRIPTION OF SPECIFIC EMBODIMENTS OF THE INVENTION

Specific embodiments of the invention will now be described by way of example, with reference to the accompanying drawing, in which:

FIG. 1 is a plan view of a slow feeder according to a first embodiment of the invention;

FIG. 2 is a side view of the slow feeder of FIG. 1;

FIG. 6 is an exploded view of the slow feeder of FIG. 1;

FIGS. 1 to 5 illustrate a slow feeder according to a first embodiment of the invention, in assembled form. FIG. 6 shows an exploded view of the same feeder.

Figure 3:
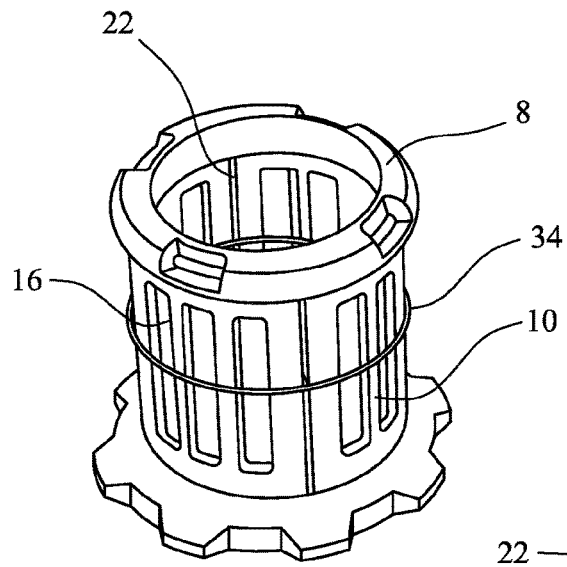
FIG. 3 is a perspective view from above of the slow feeder of FIG. 1.
Figure 4:
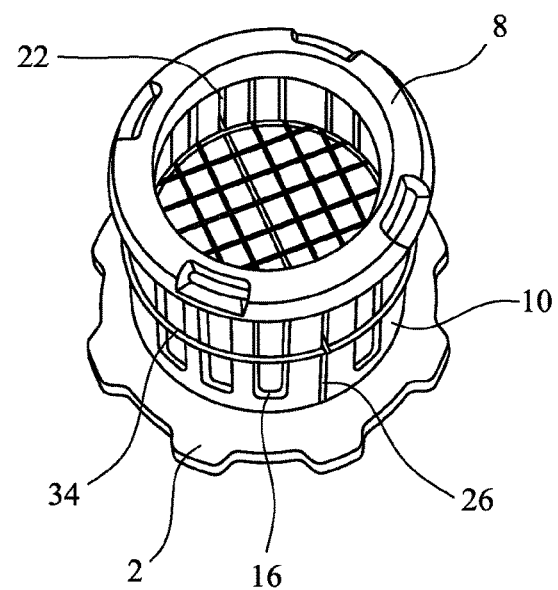
FIG. 4 is a perspective view from above of the slow feeder of FIG. 1, showing the interior of the feeder.
Figure 5:
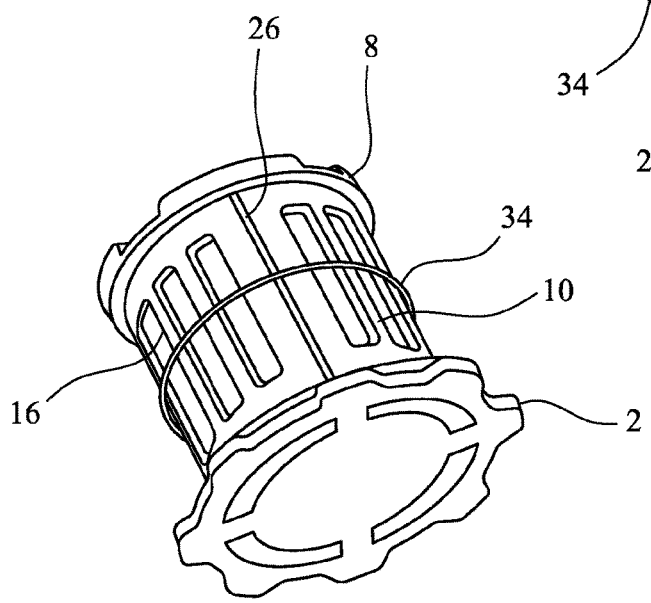
FIG. 5 is a perspective view from beneath of the slow feeder or FIG. 1.

The feeder comprises a base 2, a cylindrical side wall 4, a feeding restrictor 6 and a removable upper ring, or rim, 8.

The side wall 4 is in the shape of a circular, upright cylinder and is formed from four identical curved wall segments 10, 12, 14, 16. The base, wall segments and rim are fabricated from injection-moulded plastic.

Each wall segment forms a quarter of the circular side wall and comprises a protruding tenon and three pegs 18 at its lower end, which fit securely into a respective corresponding recess in the base 2. The four wall segments then extend upwardly from the base to form the cylindrical side wall of the slow-feeder container. Slots are defined between the vertical edges of each pair of adjacent wall segments, forming four evenly-spaced, vertical slots 20, 22, 24, 26 at 90° intervals around the periphery of the circular cylindrical container.

The removable upper rim 8 fits over the upper ends of the wall segments, latching in place by means of a rotationally-engaged hook 28 at the upper end of each wall segment, to provide mechanical support to the side wall and to close the upper ends of the slots.

The restrictor 6 is planar or flat in shape and comprises as its central portion a circular feed-covering element 30, in the form of a rectilinear grid of metal bars, welded together. The circular periphery of the feed-covering element fits within the circular side wall of the container, with a clearance of approximately 5 mm to 10 mm. Four locating elements 32 in the form of metal rods extend outwardly from the flat feed-covering element, spaced at 90° intervals around the feed-covering element. In use, the locating elements fit within respective slots in the side wall of the container.

The locating elements terminate at, and are welded to, a circular retaining element 34, which forms the outer periphery of the feeding restrictor. An internal diameter of the retaining element is approximately 10 mm greater than a maximum external diameter of the side wall of the container. As shown in FIGS. 1 to 6, the side wall segments are externally grooved, or fluted, to increase the stiffness of the side wall segments while minimising the quantity of material required to make them. The retaining element therefore only engages with, or abuts, the raised portions of the outer surfaces of the side wall segments between the flutes, or grooves. This does not affect the functionality of the interaction between the retaining element and the outer portion of the side wall, as the skilled person would appreciate.

To prepare the slow feeder for use, the rim 8 is removed from the side wall, and the feeding restrictor is removed. The slow-feeder container is filled with fodder or other desired animal feed. The restrictor is placed on top of the fodder, with the locating elements passing through the side-wall slots and the retaining element extending around the outer periphery of the side wall. The rim 8 is then secured to the upper edge of the side wall, mechanically supporting the side wall and preventing removal of the restrictor.

An animal feeding from the slow feeder removes the fodder through the openings in the feed-covering element. As food is removed, the restrictor moves downwardly, always resting on top of the food. The locating elements move downwardly within the slots. If the animal removes more food from one side of the container than another, the restrictor may tend to tilt, but is prevented from tilting excessively by abutment of the retaining element against outer surfaces of the side wall of the container, on opposite sides of the container.

FIGS. 1 to 5 illustrate the slow feeder with the restrictor in an intermediate position, half way down the container. Although no food is shown in the container in FIGS. 1 to 5, this would be the position of the restrictor after about half of the contents of the slow feeder have been eaten.

An alternative embodiment may have a structure similar to that of the slow feeder of FIGS. 1 to 5, but may omit the rim 8. In that case, the mounting of the wall segments to the base needs to be sufficiently robust to retain the wall segments in place while the horse feeds. Also, provision is preferably made to prevent the horse from lifting the feeding restrictor upwardly out of the slots. This may be achieved, for example, by providing upper edges of one or more of the wall segments with an enlarged portion or portions, for example in the form of a hook or latch, which provide resistance to the lifting of the feeding restrictor past the upper edges of the wall segments. In this embodiment, engagement between the upper edges of the wall segments and the feeding restrictor may then prevent the lifting of the feeding restrictor by the horse, with no need to close the upper ends of the slots.

FIGS. 7 to 10 illustrate a slow feeder according to a second embodiment of the invention.

The feeder comprises a container which is circular in plan view, with a slightly tapered side wall 50; the diameter of the side wall is larger at its upper edge than at its lower edge. Two vertical, blind-ended slots 52, 54 are formed, diametrically opposite each other, in the side wall. The blind-ended slots extend upwardly from the lower edge of the side wall to within approximately 5 cm of the upper edge of the side wall.

The slow feeder comprises a feeding restrictor 56 of similar design to the feeding restrictor of the first embodiment, except that it has only two locating elements 58, diametrically opposite each other, for engaging with the two slots in the side wall. The feeding restrictor thus comprises a central circular food-covering portion 60 comprising a square or rectilinear grid of metal bars with a circular periphery. The two locating elements 58 extend from diametrically opposite edges of the food-covering portion. The locating elements terminate at, and are welded to, a retaining element 62 in the form of a circular ring of larger diameter than the periphery of the food-covering element.

The external diameter of the periphery of the food-covering element is approximately 5 mm less than the internal diameter of the side wall at its smallest point, which is at its base, or lower edge. The internal diameter of the retaining element 62 is approximately 5 mm greater than the external diameter of the side wall at its largest point (reachable by the restrictor), namely at the upper ends of the slots.

It may be noted that the clearance between the external periphery of the food-covering portion and the internal diameter of the retaining element in the feeding restrictor of the second embodiment is thus sufficiently large to accommodate the tapered side wall of the container.

Figure 7:
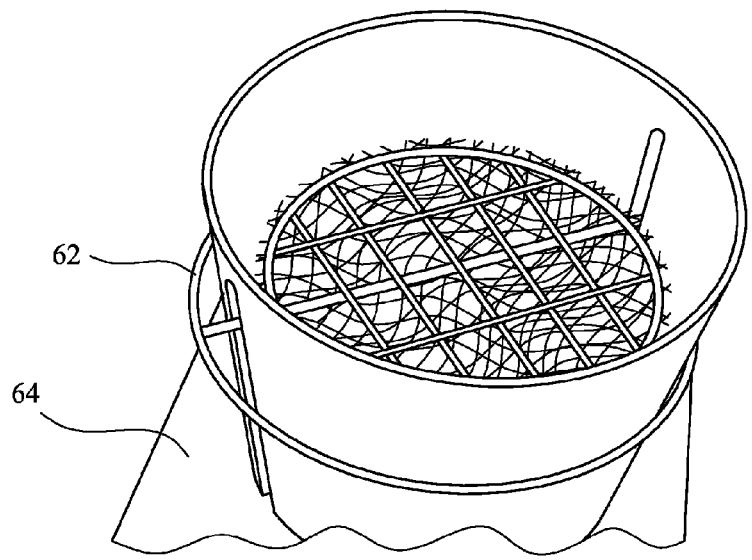
FIG. 7 is a perspective view from above of a slow feeder according to a second embodiment of the invention, the feeder containing fodder.
Figure 8:
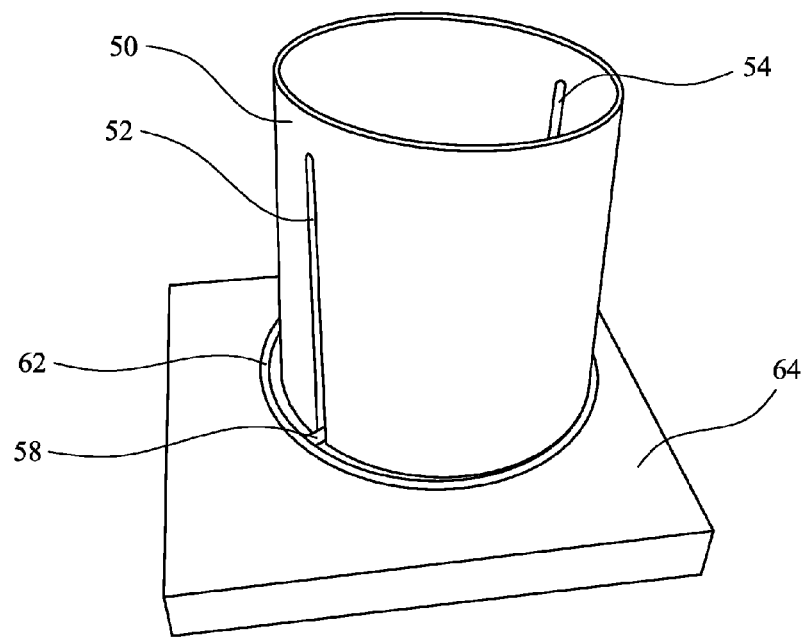
FIG. 8 is a perspective view of the slow feeder of FIG. 7, containing no fodder.
Figure 9:
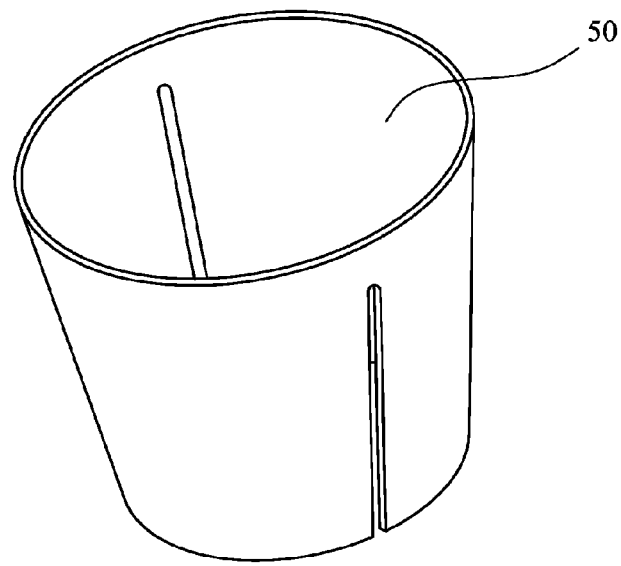
FIG. 9 is a perspective view of the slow feeder of FIG. 7 showing the container separate from the feeding restrictor.
Figure 10:
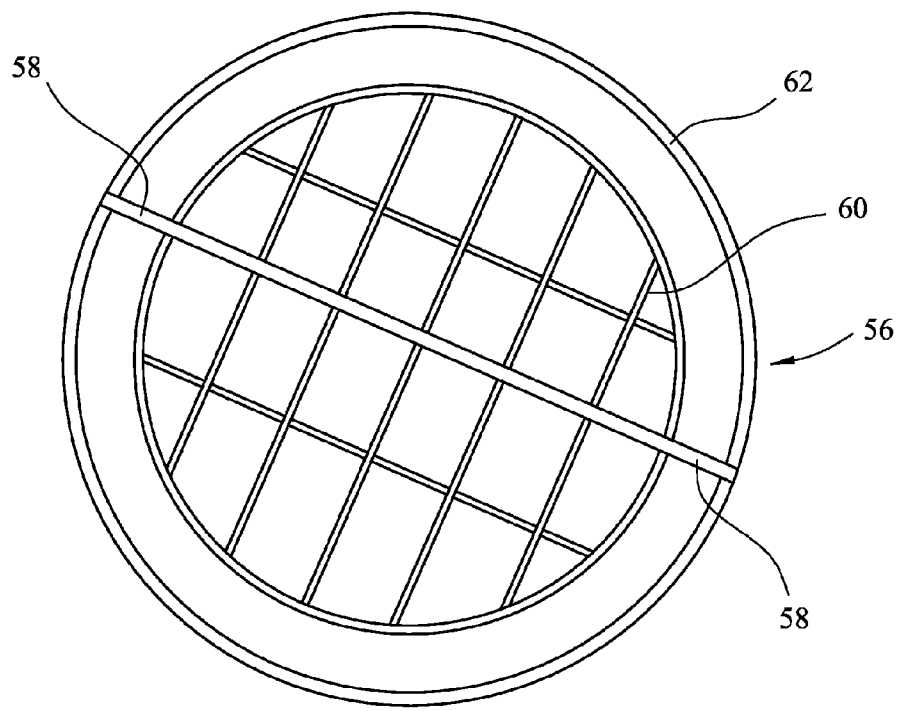
FIG. 10 shows a plan view of the feeding restrictor of the slow feeder of FIG. 7.

In order to use this feeder, the container 50 is first inverted, to rest on its upper edge. The feeding restrictor is engaged with the slots 52, 54, with the retaining element surrounding the side wall, and the inverted container is filled with desired food or fodder. A base plate 64 is then placed on the upper edge of the inverted container, and the container and base plate are turned over so that the container stands on the base plate. This is as illustrated in FIG. 7. The slow feeder can then be used for feeding animals.

Figure 11:
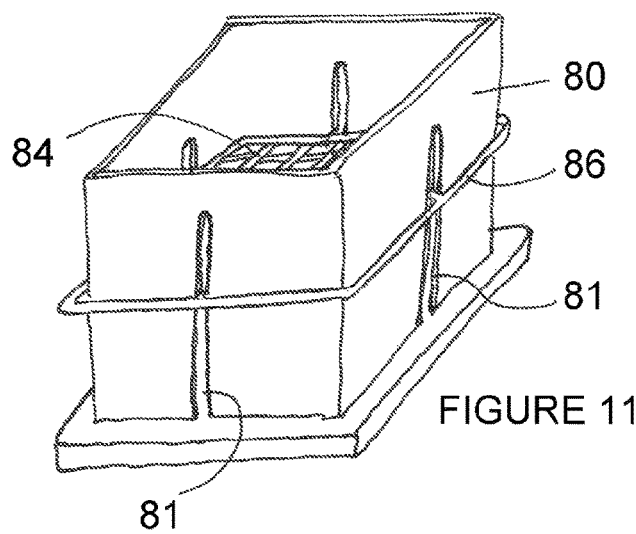
FIG. 11 is a perspective view of a slow feeder according to a third embodiment of the invention.
Figure 12:
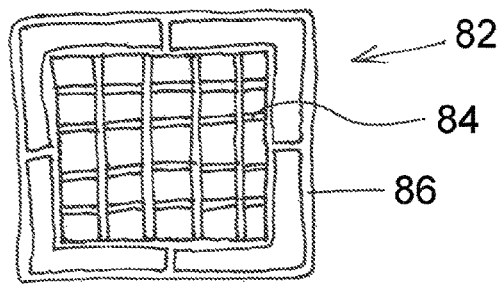
FIG. 12 is a feeding restrictor of the slow feeder of FIG. 11.

FIGS. 11 and 12 illustrate a slow feeder according to a third embodiment of the invention. This embodiment functions in the same way as the second embodiment described above but the container 80 is in the form of a square-based cylinder (i.e. is square in plan view) with slots 81 defined centrally in each of the four sides of the square. The feeding restrictor 82 is correspondingly shaped, the periphery of the food-covering element 84 and the retaining element 86 being square in shape.

Figure 13:
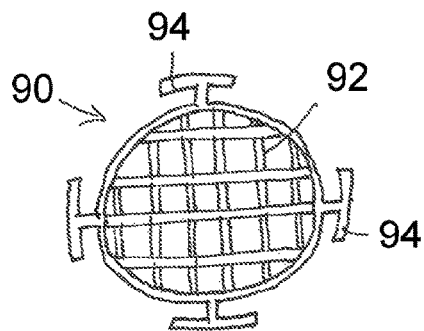
FIGS. 13 and 14 illustrate alternative forms of feeding restrictors for use with the feeders of the first and third embodiments.
Figure 14:
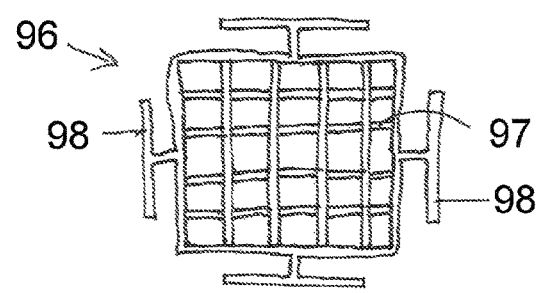

FIGS. 13 and 14 illustrate alternative forms of feeding restrictors 90, 96 for use with the containers of the first and third embodiments described above. In each case the food-covering elements 92, 97 are the same as described earlier, but the retaining elements 94, 98 are in the form of crossbars attached to the end of each locating element, rather than in the form of continuous rings. In such restrictors, the length and number of retaining elements should be selected so as to be sufficient to prevent excessive tilting of the restrictor, bearing in mind the dimensions and shape of the slow feeder container.

The invention claimed is:

1. A feeding apparatus comprising;
   a container for, in use, containing food for an animal, the container having a side wall through which a slot is defined; and
   a feeding restrictor;
   the feeding restrictor comprising a food-covering element through which at least one opening is defined for, in use, resting on top of the food such that the animal can access the food through the opening;
   a locating element which extends from the food-covering element through the slot; and
   a retaining element extending from the locating element and movably engageable with an outer portion of the container.

2. A feeding apparatus according to claim 1, in which the outer portion of the container with which the retaining element is movably engageable is an outer surface of the side wall of the container.

3. A feeding apparatus according to claim 1, in which the retaining element encircles the container.

4. A feeding apparatus according to claim 1, in which the slot is one of a plurality of slots defined through the side wall of the container, and the locating element is one of a corresponding plurality of locating elements which extends outwardly through the slots.

5. A feeding apparatus according to claim 4, in which the slots are spaced around the container, preferably being evenly spaced around the container.

6. A feeding apparatus according to claim 4, comprising two slots positioned at opposite sides of the container.

7. A feeding apparatus according to claim 4, in which the retaining element comprises a ring of a shape corresponding to an outer shape of the container, encircling the container and coupled to some or all of the locating elements.

8. A feeding apparatus according to claim 1 in which the slot is, in use, vertically-oriented.

9. A feeding apparatus according to claim 1, in which the slot is, in use, inclined.

10. A feeding apparatus according to claim 1, in which the locating element comprises a rod extending through the slot.

11. A feeding apparatus according to claim 1, in which the retaining element extending from the locating element prevents the locating element being withdrawn from the slot inwardly into the container.

12. A feeding apparatus according to claim 1, in which the retaining element comprises a ring of a shape corresponding to an outer shape of the container, encircling the container and coupled to the locating element.

13. A feeding apparatus according to claim 1, in which the slot is open or is openable at an upper end of the slot, for insertion or removal of the restrictor.

14. A feeding apparatus according to claim 1, in which the slot is open or is openable at a lower end of the slot, for insertion or removal of the restrictor.

15. A feeding apparatus according to claim 1, in which the container is openable at a lower end of the container for filling with food.

16. A feeding apparatus according to claim 1, in which the size of a cross-section of the container varies with height and in which a spacing between the food-covering element within the container and the retaining element outside the container is sufficient to allow the restrictor to move along a full length of the slot or slots.

17. A feeding apparatus according to claim 1, in which the side wall of the container is fabricated in two or more segments, the slot being defined between a pair of adjacent side-wall segments.

18. A method for feeding food to an animal, comprising the steps of;
   providing a container having a side wall through which a slot is defined;
   providing a feeding restrictor comprising a locating element and engaging the locating element with the slot, the locating element being coupled to a restraining element movably engageable with an outer portion of the container to limit tilting of the restrictor;
   placing food in the container so that the restrictor rests on top of the food; and
   allowing the animal to feed, through the restrictor, such that the locating element moves down the slot as the food is eaten.

19. A method according to claim 18, comprising the step of placing food in the container through an opening at a base, or lower end, of the container.

20. A method according to claim 18, comprising the step of positioning the restrictor on food contained in the container by inserting the locating element into an open upper end of the slot.

21. A method according to claim 20, comprising the step of closing the upper end of the slot to prevent the restrictor from being removed upwardly from the slot.

22. A method according to claim 18, comprising the step of encircling or surrounding the container with the retaining element.

* * * * *